US011395116B2

(12) United States Patent
Linder et al.

(10) Patent No.: US 11,395,116 B2
(45) Date of Patent: Jul. 19, 2022

(54) METHODS AND APPARATUS FOR REPORTING INFORMATION TO UNMANNED VEHICLES IN A WIRELESS COMMUNICATIONS NETWORK

(71) Applicant: Telefonaktiebolaget LM Ericsson (publ), Stockholm (SE)

(72) Inventors: Neiva Linder, Stockholm (SE); Remi Robert, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 190 days.

(21) Appl. No.: 16/768,073

(22) PCT Filed: Dec. 18, 2017

(86) PCT No.: PCT/SE2017/051286
§ 371 (c)(1),
(2) Date: May 28, 2020

(87) PCT Pub. No.: WO2019/125233
PCT Pub. Date: Jun. 27, 2019

(65) Prior Publication Data
US 2020/0367037 A1    Nov. 19, 2020

(51) Int. Cl.
*H04W 4/44* (2018.01)
*H04W 4/42* (2018.01)
(Continued)

(52) U.S. Cl.
CPC ............. *H04W 4/44* (2018.02); *H04W 4/021* (2013.01); *H04W 4/06* (2013.01); *H04W 4/42* (2018.02); *H04W 4/46* (2018.02); *H04W 48/16* (2013.01)

(58) Field of Classification Search
CPC .......... H04W 72/042; H04W 72/0446; H04W 72/0413; H04W 4/06; H04W 76/27; H04W 16/32; H04W 72/005; H04W 16/14
See application file for complete search history.

(56) References Cited

U.S. PATENT DOCUMENTS

| 11,159,964 | B2* | 10/2021 | Kim | ...................... H04W 24/10 |
| 2015/0089423 | A1* | 3/2015 | Tenetylo | .................. H04B 7/26 715/771 |
| 2018/0270713 | A1* | 9/2018 | Park | ...................... H04L 5/0053 |

FOREIGN PATENT DOCUMENTS

| JP | 2017168944 A | 9/2017 |
| WO | 2016160611 A2 | 10/2016 |
| WO | 2017177361 A1 | 10/2017 |

OTHER PUBLICATIONS

International Search Report and Written Opinion for International Application No. PCT/SE2017/051286, dated Jul. 30, 2018, 18 pages.

(Continued)

*Primary Examiner* — Khalid W Shaheed
(74) *Attorney, Agent, or Firm* — NDWE LLP

(57) ABSTRACT

Methods and apparatus for reporting information to unmanned vehicles in a wireless communications network. In particular there is provided a method, in a first network node operable to initiate multicast broadcasts from a first base station in a wireless communications network. The method comprising receiving a message from a second network node; and responsive to a determination that the message comprises information relevant to unmanned vehicles located within a first geographical area associated with the first base station, initiating a broadcast of a report to a plurality of unmanned vehicles located within the first geographical area, wherein the report is based on the mes- (Continued)

sage. There is also provided an unmanned vehicle and gateway node.

18 Claims, 13 Drawing Sheets

(51) Int. Cl.
*H04W 4/46* (2018.01)
*H04W 4/021* (2018.01)
*H04W 4/06* (2009.01)
*H04W 48/16* (2009.01)

(56) References Cited

OTHER PUBLICATIONS

Daher et al., "SC-PTM for MBSFN for Mission Critical Communications?" 2017, 6 pages, IEEE.
Rios et al., "UAS Reports (UREPs): Enabling Exchange of Observation Data Between UAS Operations," Feb. 2017, 22 pages, NASA/TM-2017-219462.
International Preliminary Report on Patentability, PCT App. No. PCT/SE2017/051286, dated Jul. 2, 2020, 15 pages.
Office Action, EP App. No. 17822487.9, dated Jun. 10, 2021, 9 pages.
Office Action, EP App. No. 17822487.9, dated Mar. 22, 2022, 7 pages.

* cited by examiner

METHODS AND APPARATUS FOR REPORTING INFORMATION TO UNMANNED VEHICLES IN A WIRELESS COMMUNICATIONS NETWORK

CROSS-REFERENCE TO RELATED APPLICATIONS

This application is a National stage of International Application No. PCT/SE2017/051286, filed Dec. 18, 2017, which is hereby incorporated by reference.

TECHNICAL FIELD

Embodiments disclosed herein relate to methods and apparatus for reporting information to unmanned vehicles in a wireless communications network. In particular, the embodiments disclosed herein utilise multicast broadcasts from a base station to communicate reports to unmanned vehicles located within a geographical area associated with the base station.

BACKGROUND

Commercial use and early unmanned vehicle applications are currently requesting airspace and public authorities for regulating of the low-altitude airspace, e.g., 150 m to ground. Challenges lie with the lack of infrastructure for communication, navigation and surveillance of unmanned vehicle, for example Unmanned Aerial Vehicle (UAV), operations, and consequently, the integration of such infrastructure with current Airspace Traffic Management (ATM). The development of an Unmanned Aircraft Systems (UAS) Traffic Management (UTM) system aims to enable safe and efficient low-altitude airspace unmanned vehicle operations.

Contrary to the operations commonly used for traditional aviation, the UTM platform is intended to be mostly automated. Thus, it may be required that the mechanisms for the distribution of information between the UAS be well-established. To this goal, National Aeronautics and Space Administration (NASA) developed a UAS Report (UREP) concept (as described in "UAS Reports (UREPs): Enabling Exchange of Observation Data Between UAS Operations" Rios, J. et. al. NASA/TM-2017-219462).

When information is collected, an operator or the UAS may transmit (manually or automatically) a UREP to the UAS Service Supplier (USS). The USS may then forward the UREP to a Flight Information Management System (FIMS). The UREP may then be transmitted to each UAS Operator and UAS that has requested to be notified of the type of information the UREP contains.

It is anticipated that most unmanned vehicles will be connected to the Internet. This connection may be used as a means to exchange information with the rest of the UTM ecosystem. One of the options under study for internet connectivity is a cellular network, for example Long Term Evolution (LTE). It is possible to control an unmanned vehicle through a commercial cellular network. Current solutions are generally deployed "Over the Top" (OTT) that is only to establish point-to-point IP connectivity with the unmanned vehicles.

Unmanned vehicles may also utilize device-to-device communication to share information between unmanned vehicles, for example UAVs in flight. In this example, a UAV may directly transmit a report to its geographical neighbors using its own radio interface. This can be implemented using different technologies, for example, LTE proximity services, Wifi-Direct, Wifi Neighbourhood Area Network (NAN), Bluetooth, or any other suitable interface.

With the UREP system, the architecture is centralized, with all the messages forwarded up the hierarchy to the FIMS before being transmitted to each target unmanned vehicle.

SUMMARY

According to some embodiments there is provided a method, in first network node operable to initiate multicast broadcasts from a first base station in a wireless communications network. The method comprises receiving a message from a second network node; and responsive to a determination that the message comprises information relevant to unmanned vehicles located within a first geographical area associated with the first base station, initiating a broadcast of a report to a plurality of unmanned vehicles located within the first geographical area, wherein the report is based on the message.

According to some embodiments there is provided a first network node operable to initiate multicast broadcasts from a first base station in a wireless communications network. The first network node comprises an interface; and a processor, wherein the processor is configured to; receive a message from a second network node. Responsive to a determination that the message comprises information relevant to unmanned vehicles located within a first geographical area associated with the first base station, the processor is further configured to initiate a broadcast of a report to a plurality of unmanned vehicles located within the first geographical area, wherein the report is based on the message.

According to some embodiments there is provided a method, in an unmanned vehicle, wherein the unmanned vehicle is located in a first geographical area associated with a first base station to which the unmanned vehicle is connected. The method comprises generating a message based on obtained information relevant to unmanned vehicles in the first geographical area, and transmitting the message to a first network node operable to initiate multicast broadcasts from the first base station.

According to some embodiments there is provided an unmanned vehicle, wherein the unmanned vehicle is located in a first geographical area associated with a first base station to which the unmanned vehicle is connected. The unmanned vehicle comprises an interface; and a processor, wherein the processor is configured to generate a message based on obtained information relevant to unmanned vehicles in the first geographical area, and transmit the message to a first network node operable to initiate multicast broadcasts from the first base station.

According to some embodiments there is provided a method, in a gateway node. The method comprises receiving a report and an associated target geographical area from a network node; selecting one or more target network nodes from of a plurality of network nodes each operable to initiate multicast broadcasts from a respective associated base station, wherein each of the one or more target network nodes are operable to initiate multicast broadcasts from a base station serving a geographical area which is within the target geographical area; and transmitting the report to the target network nodes.

According to some embodiments there is provided a gateway node. The gateway node comprises an interface; and a processor, wherein the processor is configured to receive a report and an associated target geographical area from a network node; select one or more target network nodes from of a plurality of network nodes each operable to initiate multicast broadcasts from a respective associated base station, wherein each of the one or more target network nodes are operable to initiate multicast broadcasts from a base station serving a geographical area which is within the target geographical area; and transmit the report to the target network nodes.

According to some embodiments there is provided a computer program comprising instructions which, when executed on at least one processor, cause the at least one processor to carry out the method as described above.

According to some embodiments there is provided a computer program product comprising a computer-readable medium with the computer program as described above.

The aforementioned embodiments allow more efficient diffusion of reports to unmanned vehicles in a wireless communications network. Furthermore, the aforementioned embodiments provide a more simple mechanism for transmitting reports to unmanned vehicles located in a particular geographical area. Therefore, it may not be necessary to record the position of each unmanned vehicle in order to target reports to unmanned vehicles located within a particular geographical area. Instead, the area each base station serves may be used to determine which area the report will be broadcasted to. Moreover, these embodiments may also improve the privacy of the users as, for example, there is no need to record the positions of the different unmanned vehicles to send them messages based on their location.

BRIEF DESCRIPTION OF THE DRAWINGS

For a better understanding of the present invention, and to show how it may be put into effect, reference will now be made, by way of example only, to the accompanying drawings, in which.

DESCRIPTION

Figure 1:
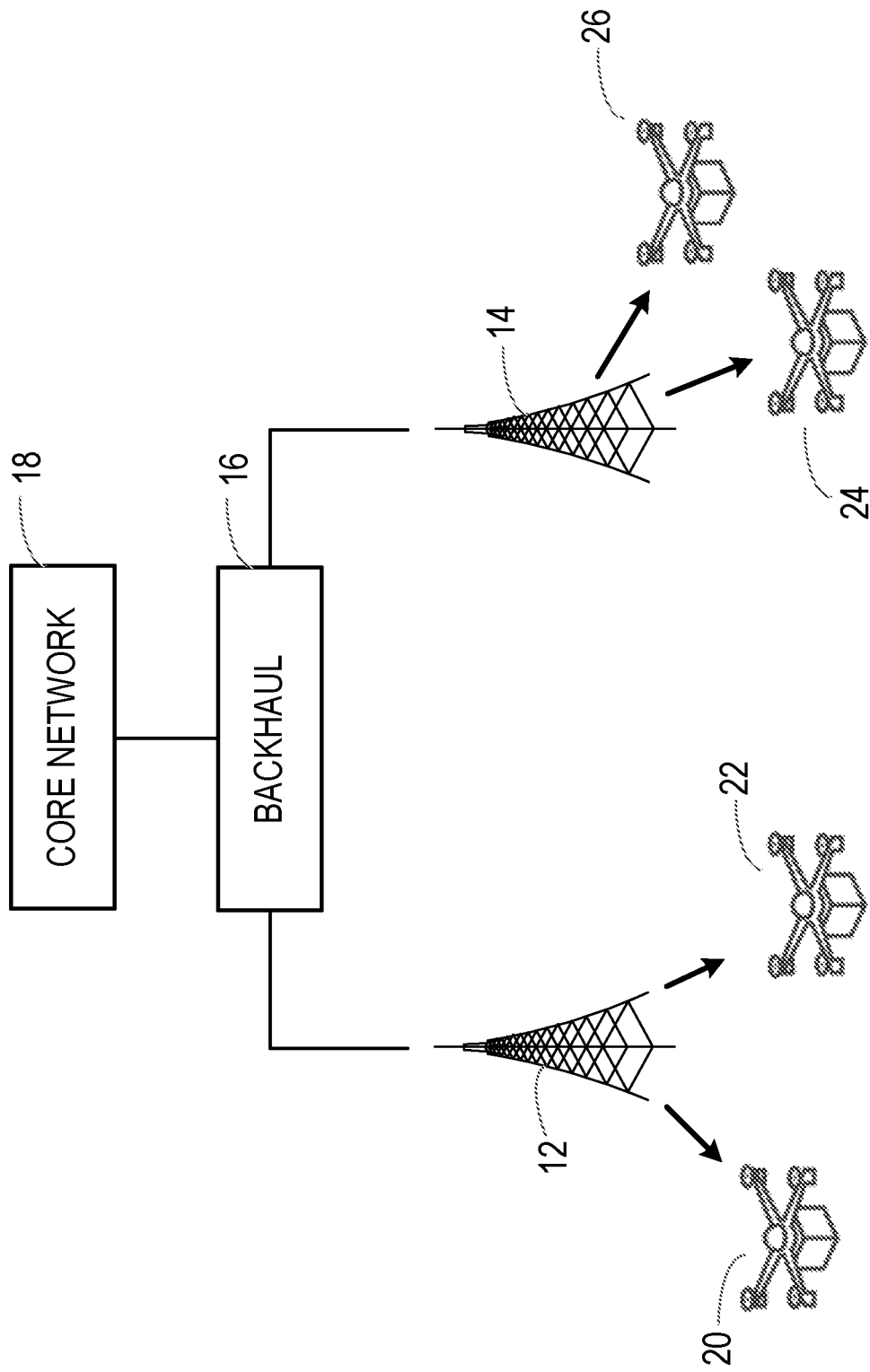
FIG. 1 illustrates a wireless communications network that may be utilized to explain the principles of embodiments of the present disclosure.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed.

Moreover, the term "processor" or "controller" also refers to other hardware capable of performing such functions and/or executing software, such as the example hardware recited above.

Although the description is given for a wireless device, or user equipment (UE), it should be understood by the skilled in the art that "UE" is a non-limiting term comprising any mobile or wireless terminal, device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

Embodiments described herein provide methods and apparatus for communicating reported information to a plurality of unmanned vehicles.

As mentioned above, in previous solutions, messages are forwarded up the hierarchy to a Flight Information Management System (FIMS), before a report is generated and transmitted to each target unmanned vehicle.

However, this may create a high load on the top of the hierarchy, for example at the FIMS, which in these scenarios collects and analyzes all the messages transmitted by the unmanned vehicles. This might lead to some delays, as well as scaling issues as the number of unmanned vehicles, and thus messages, increases.

Furthermore, this system is intended for use with point to point connectivity only. This leads to inefficiencies in the transmission for both in the wired and radio networks. In the former it can lead to congestion due to message duplication whereas in the latter it may increase the resources required and may create more interference.

Furthermore, due to the nature of information contained in a report (for example a weather report or a report accounting the detection of obstacles in an area), the relevance of such a report may often be limited to a precise geographical area. However, the current solution does not provide an efficient mechanism to deliver a message based on the position of the unmanned vehicles. Because of the usage of OTT point-to-point links, to send a message to the unmanned vehicles in a well-defined geographical area an up-to-date database containing the positions of all the UAVs may be required. Indeed, this up-to-date database may be required to extract the list of unmanned vehicles in the target area amongst all the possible unmanned vehicles.

When unmanned vehicles share reports using device-to-device communications they may suffer from other issues. For example, sharing information using this type of communication is limited by the range of the emitting unmanned vehicle, and this range may not be sufficient to cover all the impacted unmanned vehicles without relying on neighbouring vehicles to retransmit the report. Secondly, there is no control over the reports that are emitted by the unmanned vehicles and this might lead to situations where many repeated reports are received because one unmanned vehicle is (purposefully or not) sending too many messages, or many unmanned vehicles send reports for the same event.

Embodiments disclosed herein therefore make use of multicast broadcasts from base stations in a wireless communications network to transmit reports to unmanned vehicles located in a geographical area associated with the base station.

By using such point-to-multipoint communication the diffusion of reports becomes more efficient. For example, in the radio network the use of point-to-multipoint links reduces the resources required to transmit the messages. Moreover, in a wired network, it limits message duplication which reduces the queueing and therefore can improve the latency.

Furthermore, point-to-multipoint communications provide a more simple mechanism for transmitting reports to unmanned vehicles located in a particular geographical area. Therefore, it may not be necessary to record the position of each unmanned vehicle in order to target reports to unmanned vehicles located within a particular geographical area. Instead, the area each base station serves may be used to determine which area the report will be broadcasted to. Moreover, these embodiments may also improve the privacy of the users as, for example, there is no need to record the positions of the different unmanned vehicles to send them messages based on their location.

Also, embodiments described herein reduce the load and criticality of the higher levels of the hierarchy, for example the FIMS. Indeed, messages may be broadcasted to neighboring unmanned vehicles without the involvement any of the higher levels of the hierarchy. This allows for local processing and diffusion of information which only has a local scope or relevance. Furthermore, as the network nodes according to embodiments described herein are operable to process the messages and perform operations such as deduplication and aggregations, this may limit the number of redundant messages that the higher levels receive, and are then required to process. In some examples, all the storage and processing may be performed in a peer-to-peer fashion by the network nodes as described herein without any need for higher level network nodes.

Point-to-multipoint communication however, still allows for control over the report transmission from unmanned vehicles, conversely to device-to-device communication. A network node as described herein may for example, prevent the transmission of duplicated reports or messages from a malicious unmanned vehicle. Furthermore, as the point-to-multipoint communication is not dependent on the emitting range of the unmanned wireless devices, the area to which reports are transmitted may be more easily controlled.

FIG. 1 illustrates a wireless communications network 10 that may be utilized to explain the principles of embodiments of the present disclosure. The wireless communications network 10 comprises a first base station 12 and a second base station 14 which are connected via a backhaul network 16 to a core network 18.

The base stations 12 and 14 may be referred to as e.g. radio access nodes, NodeBs, evolved NodeBs (eNBs, or eNodeBs), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

The first base station 12 is communicating with a first unmanned vehicle 20 and a second unmanned vehicle 22. Each unmanned vehicle may be for example, an Unmanned Aerial Vehicle, UAV, an Unmanned Ground Vehicle, UGV, an Unmanned Underwater Vehicle, UUV, or an Unmanned Surface Vehicle, USV. In this example, the unmanned vehicles 20 and 22 are a UAV or drone. The unmanned vehicles 20 and 22 (also referred to as a wireless devices or drones) are in wireless communication with the base station 12. For example, unmanned vehicles 20 and 22 may be camped on a cell or beam which the base station 12 serves. Messages transmitted by the unmanned vehicles 20 and 22 to the base station 12 are said to be transmitted in the "uplink", while messages transmitted by the base station 12 to the unmanned vehicles 20 and 22 are said to be transmitted in the "downlink".

The second base station 14 is communicating with third and fourth unmanned vehicles 24 and 26. The third and fourth unmanned vehicles 24 and 26 may also be for example, an Unmanned Aerial Vehicle, UAV, an Unmanned Ground Vehicle, UGV, an Unmanned Underwater Vehicle, UUV, or an Unmanned Surface Vehicle, USV. In this example, the unmanned vehicles 24 and 26 are also UAVs or drones. The unmanned vehicles 24 and 26 (also referred to as a wireless devices or drones) are in wireless communication with the base station 12. For example, unmanned vehicles 24 and 26 may be camped on a cell or beam which the base station 12 serves. Messages transmitted by the unmanned vehicles 24 and 26 to the base station 12 are said to be transmitted in the "uplink", while messages transmitted by the base station 12 to the unmanned vehicles 24 and 26 are said to be transmitted in the "downlink".

The base stations 12 and 14 may be configured to transmit multicast messages to a plurality of unmanned vehicles that each respective base station is in communication with. In some examples, if a report is relevant to unmanned vehicles within a particular area that an area which a base station serves falls into, the base station may be configured to broadcast the report to all unmanned vehicles that it serves. For example the base station 12 may be configured to use a Long Term Evolution (LTE) broadcast to communicate a report to the unmanned vehicles 20 and 22. Similarly, the base station 14 may be configured to broadcast reports to the unmanned vehicles 24 and 26.

Figure 2:
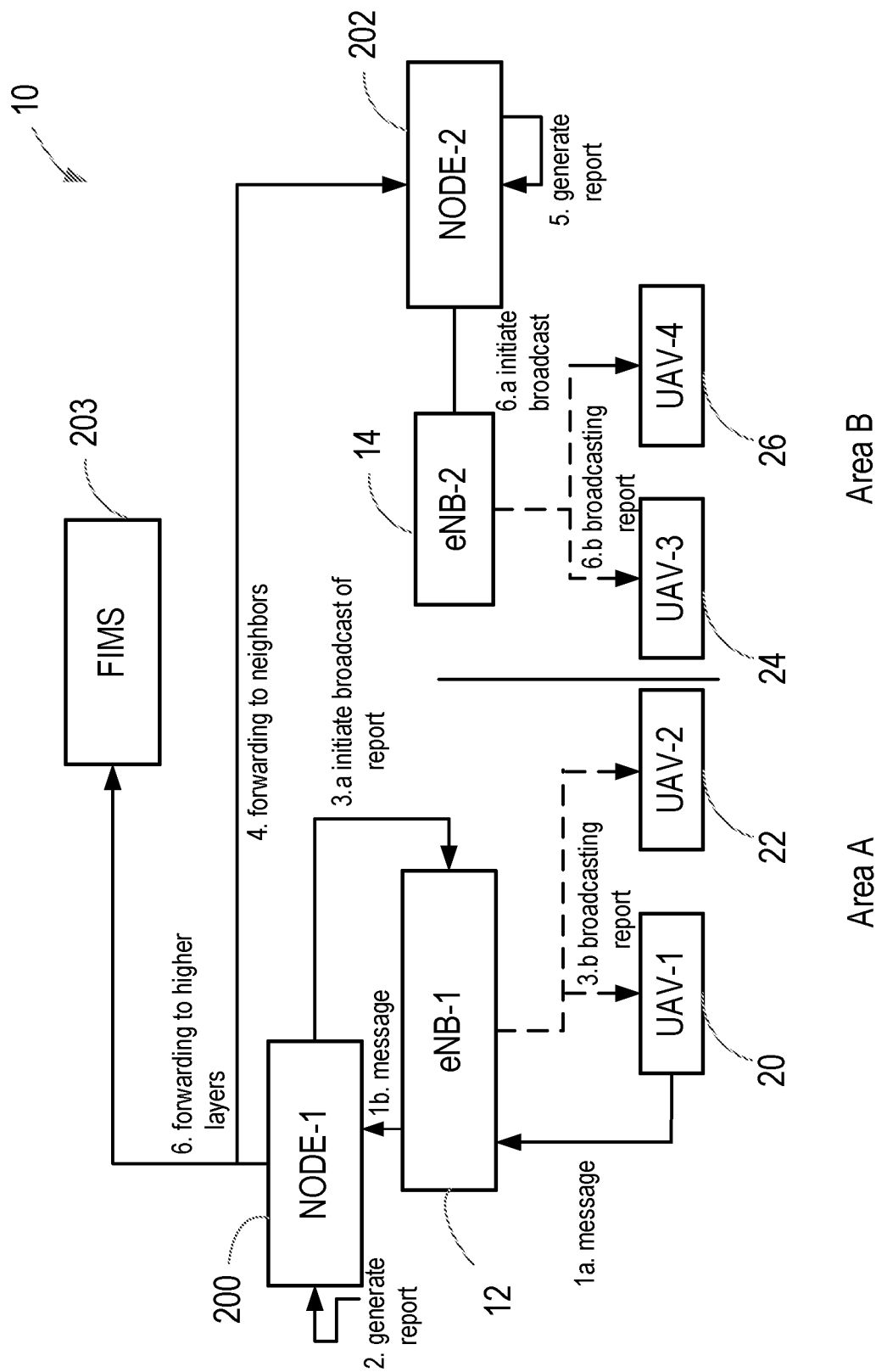
FIG. 2 illustrates an example of a network architecture illustrating the generation of reports from messages received from unmanned vehicles or network nodes according to some embodiments.

FIG. 2 illustrates an example of a network architecture illustrating the generation of reports from messages received from unmanned vehicles or network nodes according to some embodiments. The wireless communications network 10 illustrated in FIG. 1 may be implemented with an architecture as illustrated in FIG. 2. A Flight Information Management System (FIMS) 203 may be connected to network nodes, NODE-1 200 and NODE-2 202, which are each associated with a respective base station. In this example NODE-1 200 is associated with the base station eNB-1 12 and the NODE-2 202 is associated with base station eNB-2 14. The network nodes 200 and 202 may be implemented as eMBMS gateways.

The NODE-1 200 may be operable to initiate multicast broadcasts from the base station eNB-1 12. NODE-2 202 may be operable to initiate multicast broadcasts from the base station eNB-2 14. For example, the network nodes NODE-1 and NODE-2 may comprise Evolved Multimedia Broadcast Multicast Services (eMBMS) gateways operable to initiate eMBMS broadcasts from the base stations 12 and 14 respectively.

Each unmanned vehicle 20, 22, 24 and 26 may be operable to transmit messages to the network node NODE-1 200 or NODE-2 202 which is connected to the base station which the unmanned vehicle is communicating with. For example, the unmanned vehicles may be configured to transmit messages containing information about the weather in their surroundings.

Figure 3:
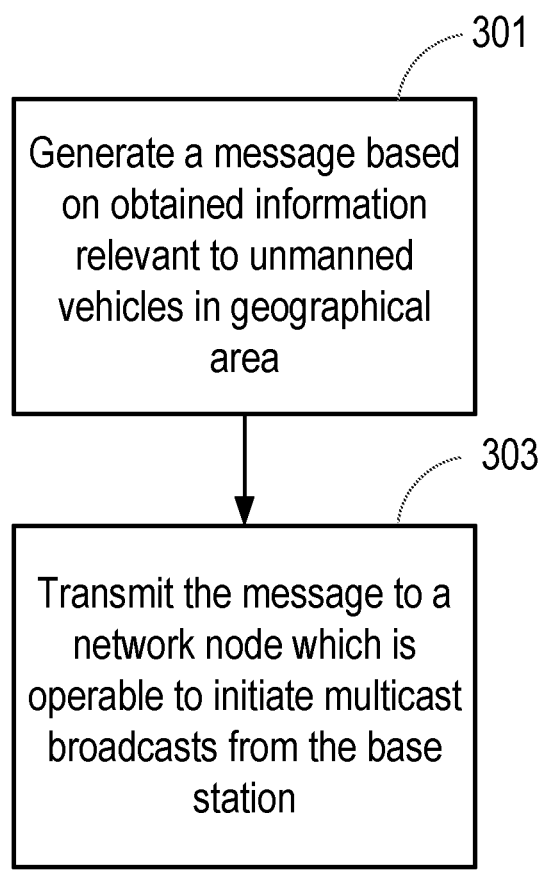
FIG. 3 illustrates a method in an unmanned vehicle according to some embodiments.

FIG. 3 illustrates a method performed by an unmanned vehicles, for example any one of unmanned vehicles 20, 22, 24 and 26.

Each unmanned vehicle 20, 22, 24, 26 is located in a geographical area associated with the base station 12, 14 to which the unmanned vehicle 20, 22, 24, 26 is connected. In other words, unmanned vehicles 20, 22 are located in a first geographical area, Area A, which may comprise the area which the first base station 12 is capable of serving. The unmanned vehicles 24 and 26 are located in a second geographical area, Area B, which may comprise the area which the second base station 14 is capable of serving. The method as illustrated in FIG. 3 may be performed by any one of these unmanned vehicles.

The unmanned vehicle performing the method illustrated in FIG. 3 may be located in a geographical area associated with a base station to which the unmanned vehicle is connected, as described above. In other words, the unmanned vehicle is located in a geographical area served by the base station to which the unmanned vehicle is connected. In step 301 the unmanned vehicle generates a message based on obtained information relevant to unmanned vehicles in the geographical area. Information which may be relevant to other unmanned vehicles in the geographical area may be, for example, weather related information, information regarding potential obstacles in the area, information relating to nearby no coverage zones, the position and/or planed path of the unmanned vehicle, or any other information which may in some way be considered relevant to unmanned vehicles located within the first geographical area, or an area near to reporting unmanned vehicle. For example, the unmanned vehicle may be equipped with a sensor collecting information relating to the temperature in the surrounding area.

In step 303 the unmanned vehicle transmits the message to a network node which is operable to initiate multicast broadcasts from the base station. The message may be transmitted to the network node by first transmitting the message to the base station. For the example illustrated in FIG. 2, unmanned vehicles 20 and 22 may be configured to transmit a message to NODE-1 200 via eNB-1 12. Similarly, unmanned vehicles 24 and 26 may be configured to transmit a message to NODE-2 202 via the eNB-2 14.

Figure 4:
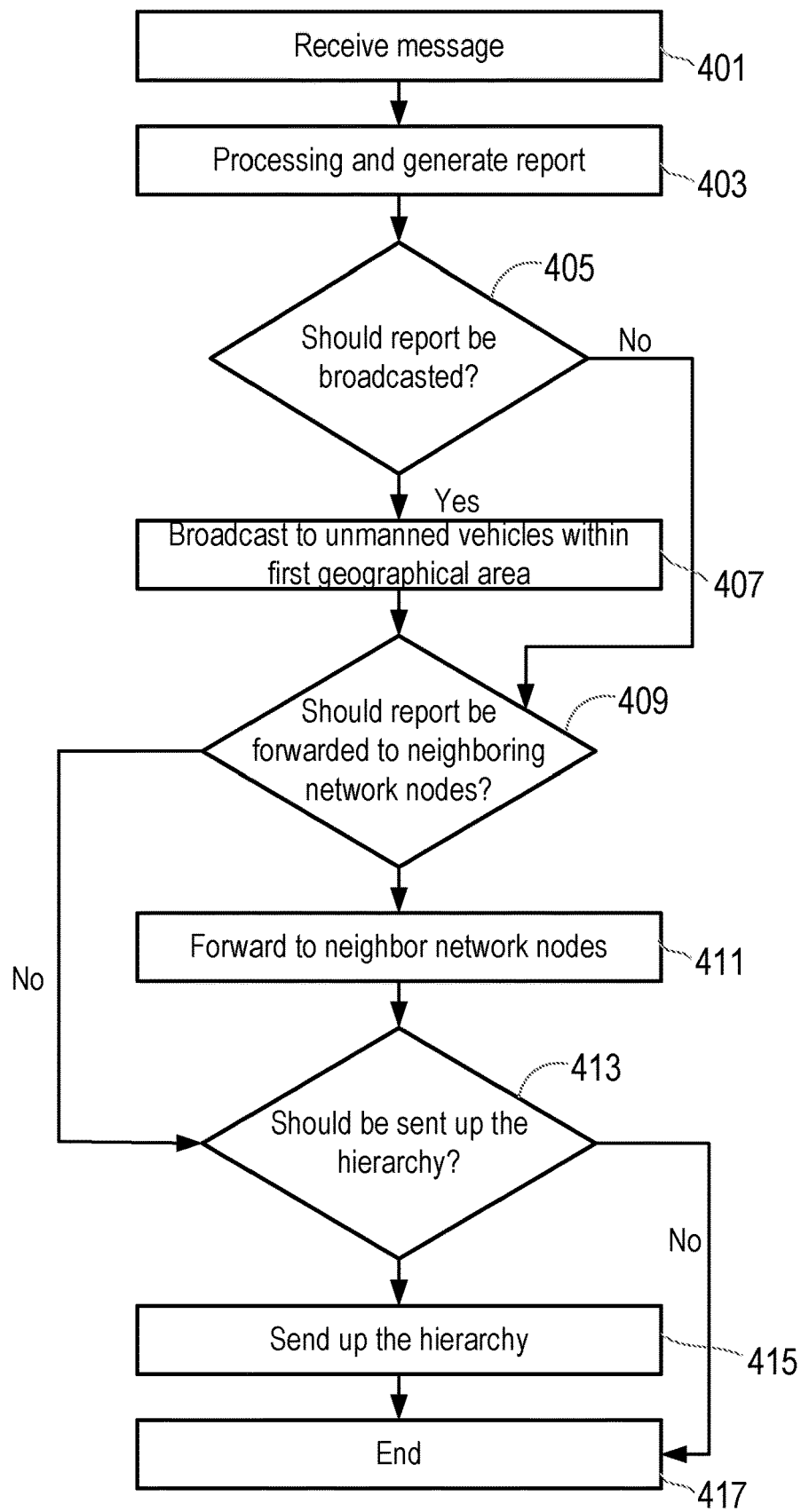
FIG. 4 illustrates a method in a first network node operable to initiate multicast broadcasts from a first base station according to some embodiments.

FIG. 4 illustrates a method in a first network node, for example one of NODE-1 200 and NODE-2 202, operable to initiate multicast broadcasts from a first base station. In step 401 the network node receives the message from a second network node. The second network node may comprise one of the plurality of unmanned vehicles in the first geographical area. For the example illustrated in FIG. 2 therefore, where the first network node comprises NODE-1 200, the second network node may comprise one of unmanned vehicles 20 or 22. However, the second network node may alternatively comprise another network node operable to initiate multicast broadcasts from a third base station. In other words, for the example of FIG. 2 where the first network node comprises NODE-1 200, the second network node may comprise the NODE-2 202.

The second network node may in some embodiments comprise the Flight Information Management System, FIMS.

In step 401 therefore the first network node may receive a message from any one of: the Flight Information Management System, FIMS, an unmanned vehicle in the first geographical area served by the first base station, or another network node operable to initiate multicast broadcasts from another base station.

In examples where the second network node comprises an unmanned vehicle, the message may be received at the first network node via its associated base station. For example, as illustrated in FIG. 2 the message from unmanned vehicle 20 is transmitted to the eNB-1 12 which forwards the message to NODE-1 200.

In some embodiments, the first network node may determine a target geographical area associated with the message, and responsive to the target geographical area comprising the first geographical area, the first network node may determine that the message comprises information relevant to unmanned vehicles located in the first geographical area. For example, if the message relates to an obstacle in the first geographical area, the first network node may determine that the target area associated with the message is the first geographical area. As another example, if the message relates to an error occurring at the unmanned vehicle, the first network node may determine that the message has no target area associated with it, and therefore that the message does not comprise information relevant to unmanned vehicles located in the first geographical area.

Furthermore, responsive to the target area comprising a second geographical area, the first network node may be configured to transmit the message to a third network node operable to initiate multicast broadcasts from a second base station in the wireless communications network, wherein the second base station is associated with the second geographical area. For example, NODE-1 200 may be configured to transmit the message to NODE-2 if the target area comprises Area-B. For example, due to a proximity between NODE-1 and NODE-2, a message relating to a temperature recorded by an unmanned vehicle may also be considered to be relevant to unmanned vehicles in a wider area, and therefore the target area may also comprise Area B.

In step 403 the first network node processes and generates a report based on the received message. This step may occur responsive to a determination that the message comprises information relevant to unmanned vehicles located within a first geographical area associated with the first base station.

In some examples, the report may be based on a plurality of messages received from a plurality of second network nodes. For example, the first network node may receive a plurality of messages from a plurality of unmanned vehicles connected to the first base station which all indicate that the temperature in the area is dropping. From this the first network node may conclude that the temperature in the area served by the first base station has dropped. However, if only one of the unmanned vehicles in the geographical area has transmitted a message indicating that the temperature is dropping, the first network node may, for example, conclude that this is an anomalous message, and may determine not to include this information when generating a temperature report for the geographical area.

In step 405, the first network node determines whether the report should be broadcasted to a plurality of unmanned vehicles in the geographical area. In some examples, the first network node may determine that the report may need to be transmitted to the FIMS to determine whether the report should be transmitted. In other examples, the report may not be relevant for unmanned vehicles located in the geographical area served by the base station associated with the first network node, and therefore the report may be transmitted to other network nodes operable to initiate multicast broadcasts from base stations.

If at step 405 the first network node determines that the report should be broadcasted to unmanned vehicles within the first geographical area, the method passes to step 407 in which the first network node initiates a multicast broadcast of the report from the base station. For the example illustrated in FIG. 2 therefore, the NODE-1 initiates a broadcast from the eNB-1. The eNB-1 then broadcasts the report to the unmanned vehicles 20 and 22 using point-to-multipoint communication.

Each unmanned vehicle in the first geographical area may then receive a report from the first base station, wherein the report comprises information relevant to unmanned vehicles located in the first geographical area. However, in some embodiments, the unmanned vehicles may selectively receive reports from a plurality of reports broadcast by the first base station, based on which of a plurality of communication channels each of the plurality of reports is broadcasted over. For example, the first network node may be configured to determine a category of the report. For example, if the report relates to a temperature of the area, the category may be determines as a weather category. If however, the report relates to an obstacle the unmanned vehicle has encountered, it may be categorised under an area mapping category. The first network node may then be configured to initiate the broadcast from the base station over different communication channels based on the determined category. Here a communication channel refers to subdivision of a transmission medium, for example frequency resources, allowing for transmitting multiple streams of information simultaneously.

For example, if the category is determined as the weather category, the report may be broadcasted by the base station using a first communication channel comprising a first set of frequency resources. If the category is determined as the area mapping category, the report may be broadcasted by the base station using a second communication channel comprising a second set of frequency resources.

An unmanned vehicle may then be configured to only receive reports on specific channels used to transmit reports in categories that are relevant to that particular unmanned vehicle. For example, a particular unmanned vehicle may be operating at an altitude outside the range included in the area mapping category, and therefore reports broadcast on this channel may not be relevant to this particular unmanned vehicle.

In some embodiments, the first network node may be configured to initiate multiple broadcasts of the report from the first base station.

The method may end, or may in some embodiments then pass to step 409.

If at step 405 the first network node determines that the report should not be broadcasted to unmanned vehicles within the first geographical area, the method may end, or may in some embodiments pass to step 409.

In step 409 the first network node determines whether the report should be forwarded to neighbouring network nodes.

If in step 409 the first network node determines that the report should be forwarded to a neighbouring network node, the method passes to step 411 in which the first network node forwards the report to a neighbouring network node. This may occur in response to the target area comprising a second geographical area served by a second base station. A third network node may be operable to initiate multicast broadcasts from the second base station. The first network node may therefore transmit the message to the third network node.

For the example illustrated in FIG. 2, NODE-1 200 may determine that a report should be forwarded to NODE-2 202. This may occur in response to a determination that the report comprises information relevant to unmanned vehicles in a second geographical area associated with eNB-2 14. Therefore, by forwarding the report to the NODE-2 202, NODE-1 200 allows for the report to the broadcasted by eNB-2 14 to unmanned vehicles in the second geographical area associated with eNB-2 14.

In some embodiments the report may be transmitted from NODE-1 200 to NODE-2 202 using an internet connection between NODE-1 200 and NODE-2 202.

It will be appreciated that the first network node may acquire the knowledge of the geographical areas associated with neighbouring base stations either through static configuration or through access to a gateway database.

The method may then end, or in some embodiments, may pass to step 413.

If at step 409 the first network node determines that the report should not be forwarded to a neighbouring network node, the method passes to step 413. This may occur in response to a determination that the report is not relevant to unmanned vehicles in the second geographical area. For example, the report may relate to obstacles in the first geographical area, and may therefore be considered not to be relevant to unmanned vehicles located in the second geographical area. The method may then end, or in some embodiments, may pass to step 413.

In step 413 the first network node determines whether the report should be sent to a FIMS or equivalent network node higher up the network hierarchy. If in step 413 the first network node determines that the report should be forwarded to a network node higher up the hierarchy, the method passes to step 415 in which the first network node forwards the report to a network node higher up the hierarchy.

For example, the network node 200 may determine that the report comprises information relevant to the entire network, and may therefore forward the report higher up the hierarchy so that it may be distributed more widely across the network. The method may then end in step 417.

If at step 413 the first network node determines that the report should not be forward to a network node higher up the hierarchy, the method may end in step 417.

Figure 5:
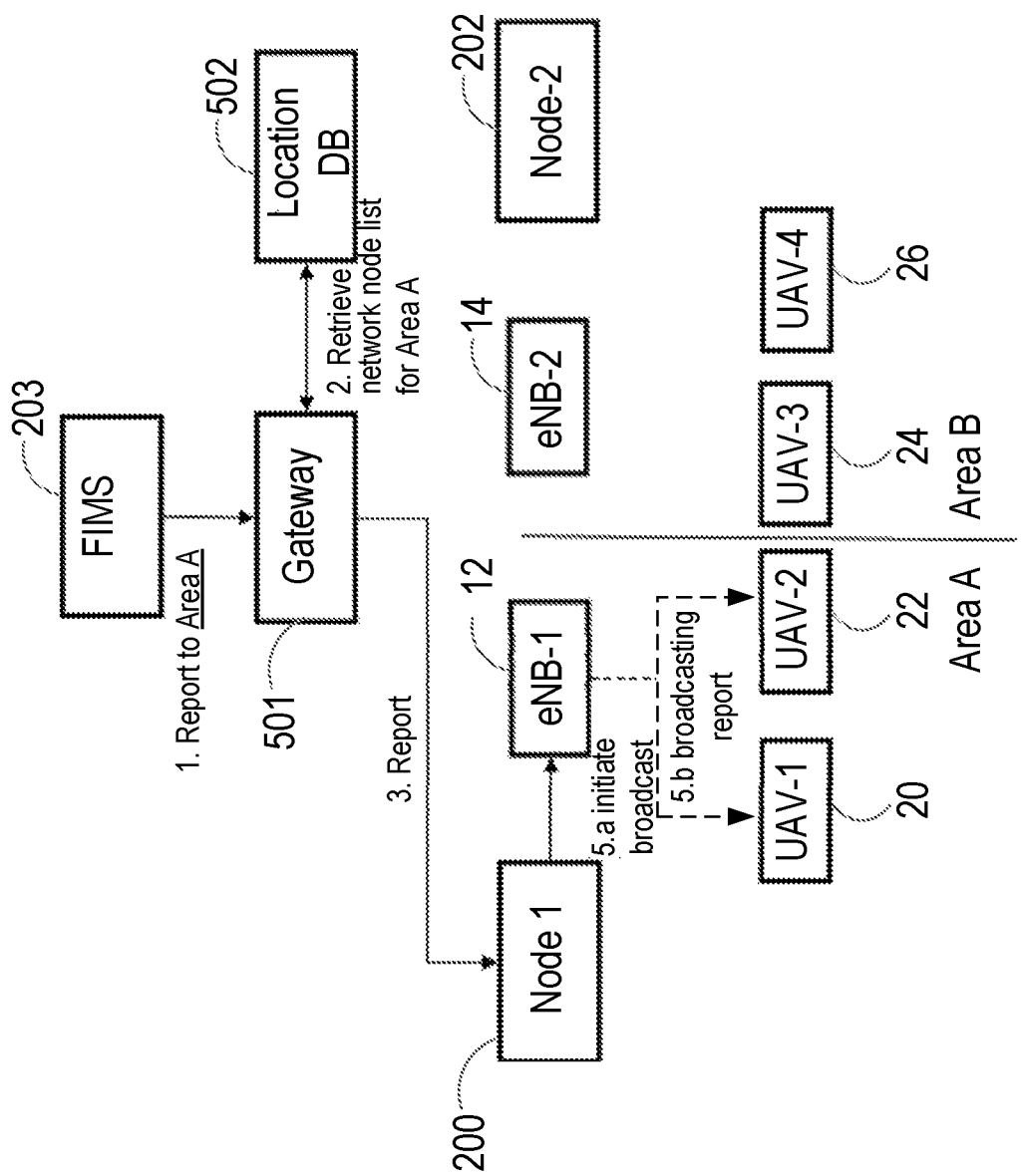
FIG. 5 illustrates an example of a network architecture illustrating the generation of reports from messages received from network nodes higher in the network architecture according to some embodiments.

FIG. 5 illustrates an example of a network architecture illustrating the generation of reports from messages received from unmanned vehicles or network nodes according to some embodiments.

The architecture in FIG. 5 is similar to that illustrated in FIG. 2, and similar components have been given corresponding reference numerals. The architecture illustrated in FIG. 5 further comprises a gateway node 501 configured to receive messages from a network node higher up in the architecture, for example a FIMS. The gateway node 501 may act as an interface between an outside entity and the network nodes in the mobile network operator's network. It may have access to a database 502 containing information (at least locations) relating to all network nodes operable to initiate broadcasts from base stations in the mobile network operator's network.

The gateway node 501 may also be configured to query a database 502, which may be cloud based or located externally to the gateway node 501. The database 502 may comprise information relating a plurality of network nodes to the base stations that they are each respectively operable to initiate multicast broadcasts from, along with the geographical areas served by each base station.

Figure 6:
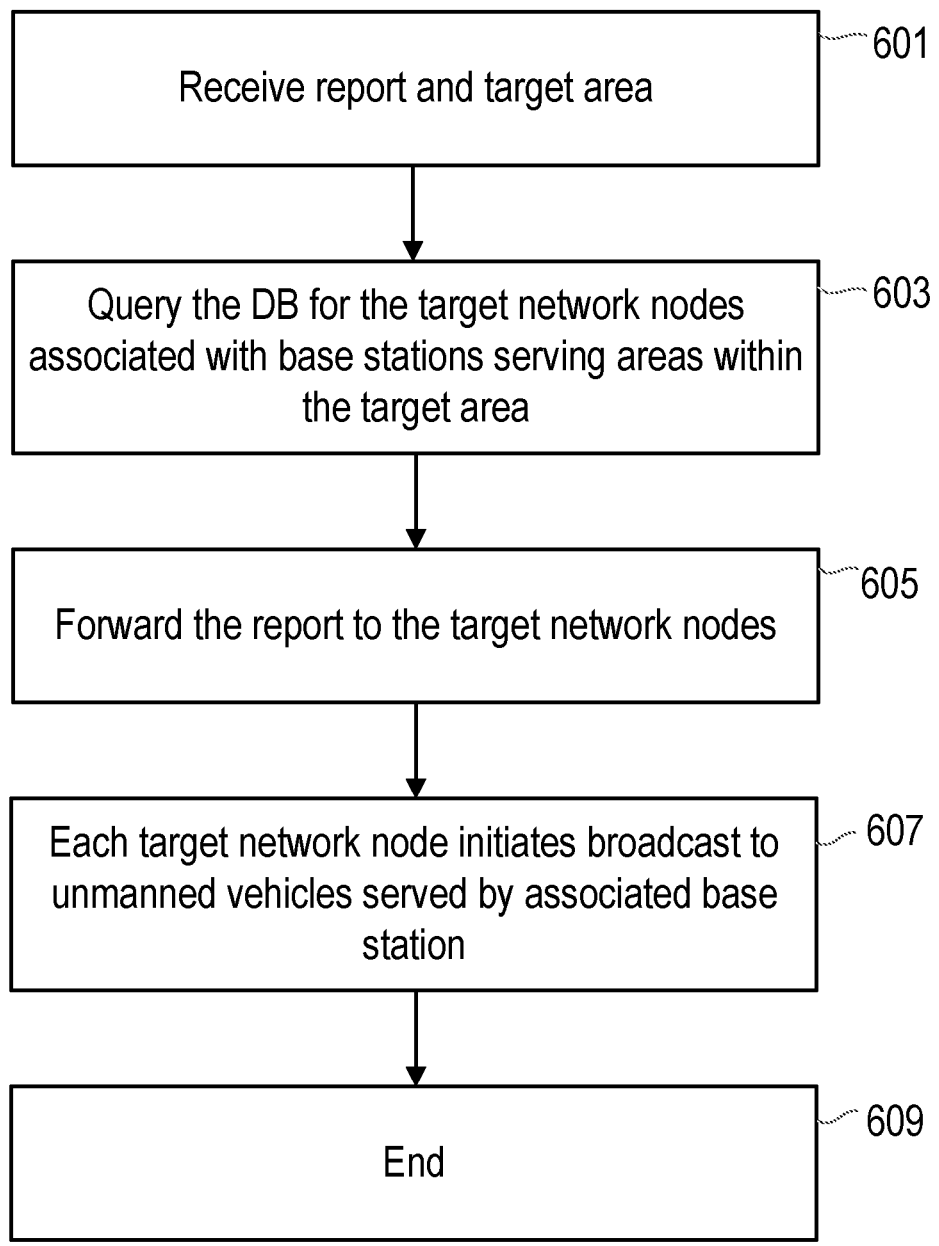
FIG. 6 illustrates a method of transmitting a report message to a plurality of unmanned vehicles.

FIG. 6 illustrates a method of transmitting a report message to a plurality unmanned vehicles.

In step 601 the gateway node receives a report and an associated target geographical area from a network node. In the example illustrated in FIG. 5 the gateway node 501 receives a report from the FIMS which is directed to unmanned vehicles in Area-A, i.e. unmanned vehicles 20 and 22. In this example the report is directed to unmanned vehicles in an area served by a single base station, however it will be appreciated that the report may be directed towards unmanned vehicles which are served by more than one base station.

The gateway node may then select one or more target network nodes from a plurality of network nodes each operable to initiate multicast broadcasts from a respective associated base station, wherein each of the one or more target network nodes are operable to initiate multicast broadcasts from a base station serving a geographical area which is within the target geographical area.

For example, the gateway node may, in step 603 query the database 502 for the target network nodes associated with base stations serving areas within the target area. In the example of FIG. 5 therefore, the target network nodes comprise only NODE-1 200. It will be appreciated that in some embodiments, the gateway node may comprise a database 502.

In step 605 the gateway node 501 transmits the report to the target network nodes. In the example of FIG. 5 therefore, the gateway node 501 transmits the report to NODE-1 200.

In step 607, each target node receiving the report may then initiate a broadcast of the report from the base station to which it is associated. In the example of FIG. 5 therefore, NODE-1 initiates a broadcast of the report from eNB-1 to the unmanned vehicles 20 and 22 located in Area-A. The method may then end in step 609.

By contrast in some examples, the gateway node may not have access to a database 502. In these examples, the gateway node 501 may forward the report to each network node operable to initiate a multicast broadcast from a base station. Each network node receiving the report may then determine whether the target area of the report comprises the geographical area associated with the base station that the network node is operable to initiate broadcasts from, if so, the network node may initiate a broadcast, if not, the network node may ignore the report.

Returning to the steps 403 of FIG. 4, it will be appreciated that a report may be based on any number of received messages transmitted by any number of network nodes. In particular, the messages may have been transmitted by network nodes of different types. For example, NODE-1 of FIG. 2 may receive weather related messages from both unmanned vehicles 20 and 22, and also a weather related message from NODE-2. The message received from NODE-2 may have originated from one of the unmanned vehicles 24 and 26. However, due to the proximity of NODE-1 and NODE-2, NODE-1 may have determined that this message from an unmanned vehicle in Area-A was relevant to the unmanned vehicles in Area-B.

A network node such as NODE-1 and NODE-2 may therefore be configured to aggregate messages of the same type in order to generate a report. For example, averages of reported metrics may be taken to generate a report. Weightings may be applied to messages received from particular network nodes to compensate for how reliable a particular network node is considered to be. For example, it may be considered that messages received from other network nodes operable to initiate multicast broadcasts, are more reliable that messages received from unmanned vehicles.

In some examples, information in received messages may be aggregated with information in existing databases to generate the reports.

A network node may also perform filtering to remove messages giving the same information, in order to avoid the same event being reported by several unmanned vehicles. Alternatively or additionally, the network node may perform rate limiting to prevent one unmanned vehicle from flooding the network with messages. Processing at the first network node could be, for instance, anonymization, aggregation or categorization. It is to be noted that processing could be done in a distributed fashion and involve multiple network nodes, for instance to compute weather forecast on a larger scale, or to compute statistics over a large area.

In some examples, a network node may store messages and use them as a base to decide of the relevance of a subsequent message. For instance a network node may only generate a report relating to an obstacle responsive to N messages being received relating to the obstacle.

Figure 7:
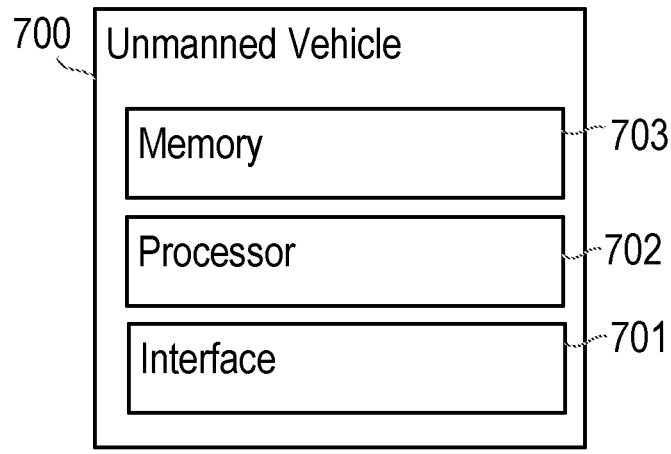
FIG. 7 illustrates an unmanned vehicle according to some embodiments.

FIG. 7 illustrates an unmanned vehicle 700 according to some embodiments. The unmanned vehicle 700 comprises an interface 701, a processor 702 and a memory 703. The processor is configured to generate a message based on obtained information relevant to unmanned vehicles in the first geographical area, and transmit the message to a first network node operable to initiate multicast broadcasts from the first base station.

Figure 8:
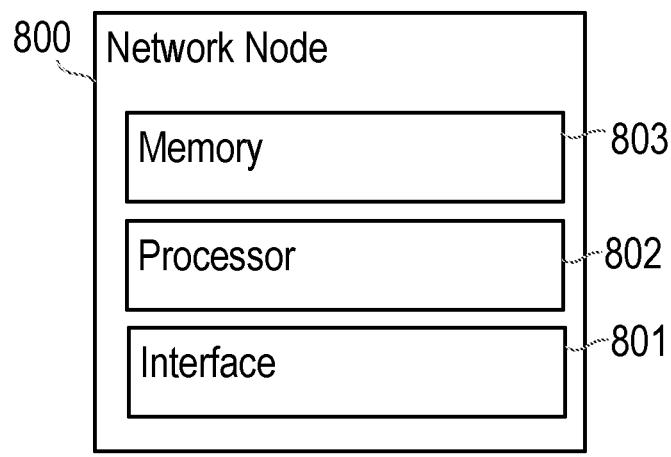
FIG. 8 illustrates a network node according to some embodiments.

FIG. 8 illustrates a network node 800 according to some embodiments. The network node 800 comprises an interface 801, a processor 802 and a memory 803. The processor is configured to receive a message from a second network node; and responsive to a determination that the message comprises information relevant to unmanned vehicles located within a first geographical area associated with the first base station, initiate a broadcast of a report to a plurality of unmanned vehicles located within the first geographical area, wherein the report is based on the message.

Figure 9:
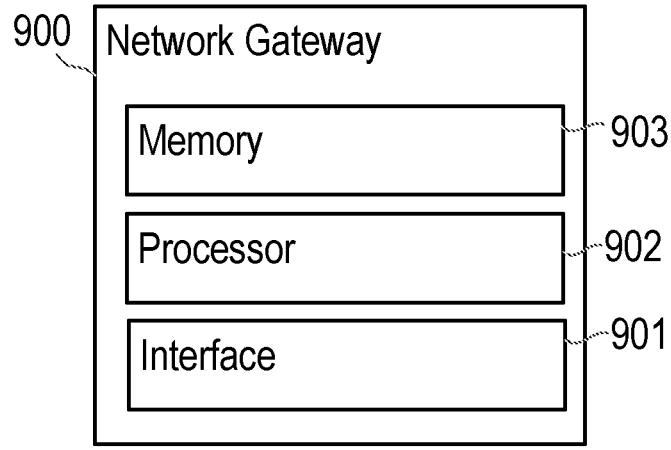
FIG. 9 illustrates a network gateway according to some embodiments.

FIG. 9 illustrates a gateway node 900 according to some embodiments. The gateway node 900 comprises an interface 901, a processor 902, and a memory 903. The processor is configured to receive a report and an associated target geographical area from a network node; select one or more target network nodes from of a plurality of network nodes each operable to initiate multicast broadcasts from a respective associated base station, wherein each of the one or more target network nodes are operable to initiate multicast broadcasts from a base station serving a geographical area which is within the target geographical area; and transmit the report to the target network nodes.

There is therefore provided methods and apparatus for reporting information to unmanned vehicles in a wireless communications network. In particular, the method and apparatus disclosed make use of broadcasted information for reports relevant to unmanned vehicles located in a particular geographical area. By making use of broadcasts, the amount of resources required to transmit information to the target unmanned vehicles may be reduced and the load on higher levels in the network architecture may also be reduced.

Figure 10:
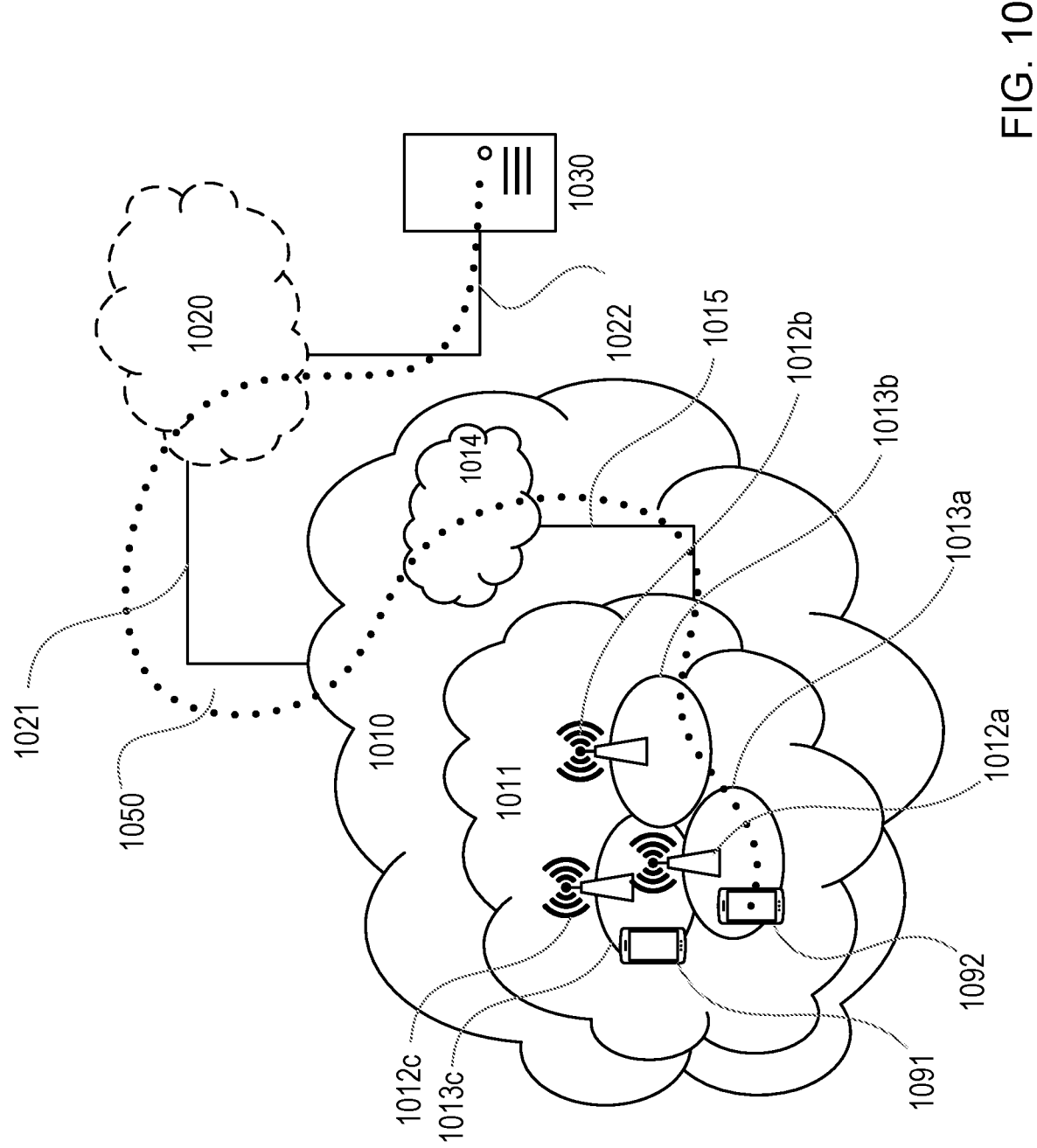
FIG. 10 illustrates a telecommunication network connected via an intermediate network to a host computer in accordance with some embodiments.

FIG. 10 illustrates a telecommunication network connected via an intermediate network to a host computer in accordance with some embodiments. With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. For example, the base stations 1012a and 1012b may correspond to base stations 12 and 14 in FIGS. 1, 2 and 5. The coverage areas 1013a and 1013b may then correspond to Area-A and Area-B respectively. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. UE 1092 may comprise unmanned vehicle 20 or 22. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
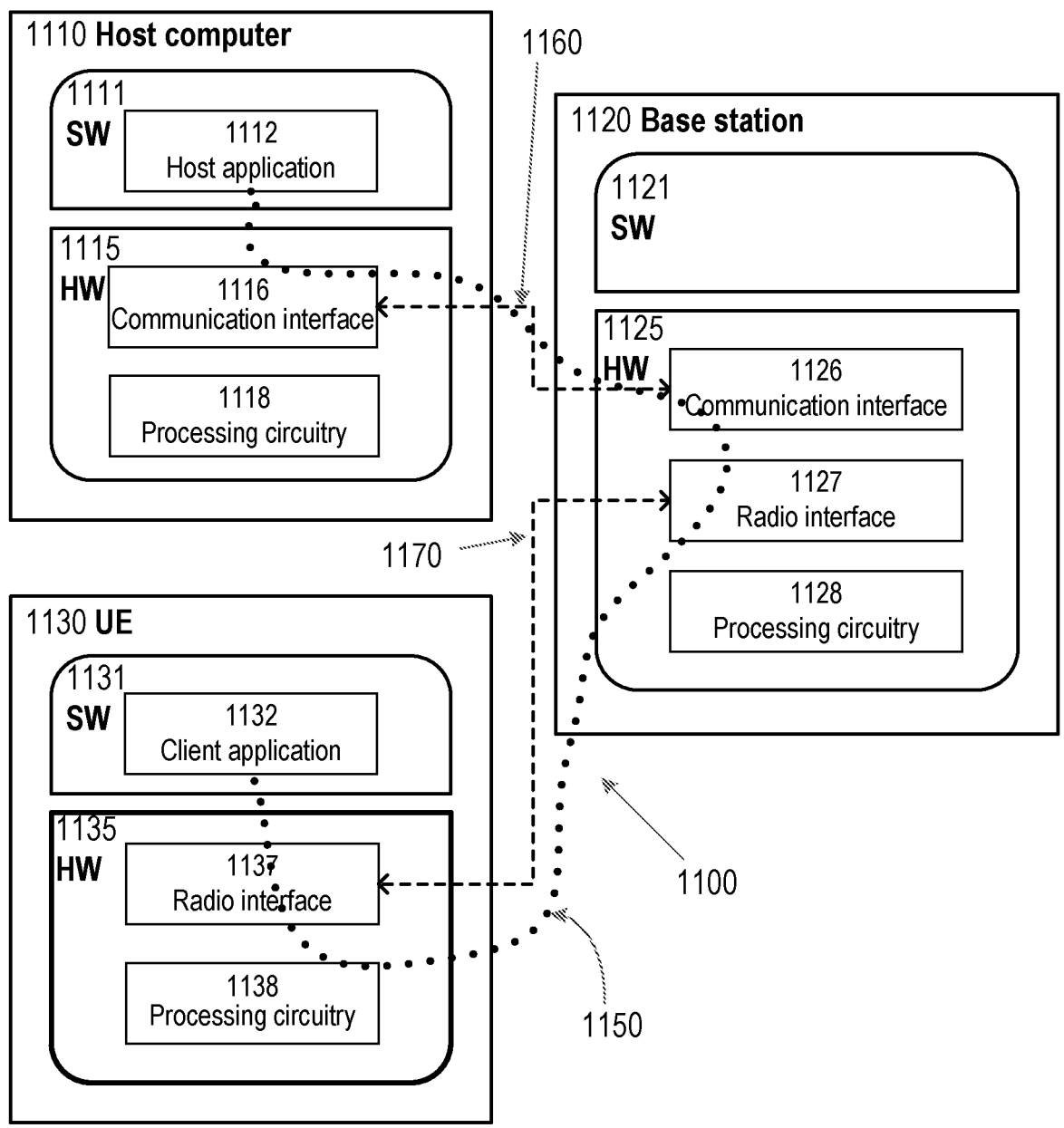
FIG. 11 illustrates a host computer communicating via a base station with a user equipment over a partially wireless connection in accordance with some embodiments.

FIG. 11 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. The UE may be any of the unmanned vehicles 20, 22, 24 and 26 illustrated in FIGS. 1, 2 and 5. In providing the service to the remote user, host application 1112 may provide user data which is transmitted using OTT connection 1150. In particular, host computer 1110 may be operable to perform the processing described with respect to the network nodes 200 and 202 in FIGS. 2 and 5. In other words, these network nodes may be implemented by the host computer 1110.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012*a*, 1012*b*, 1012*c* and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the validation process of messages transmitted between the wireless devices or UEs in the network and thereby provide benefits such as reducing the likelihood of fatal incidents.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

It will be appreciated that not only may the processing of the network nodes 200 and 202 be performed by such a host computer, but also the gateway node 501 and database 502 may be implemented by a host computer.

Figure 12:
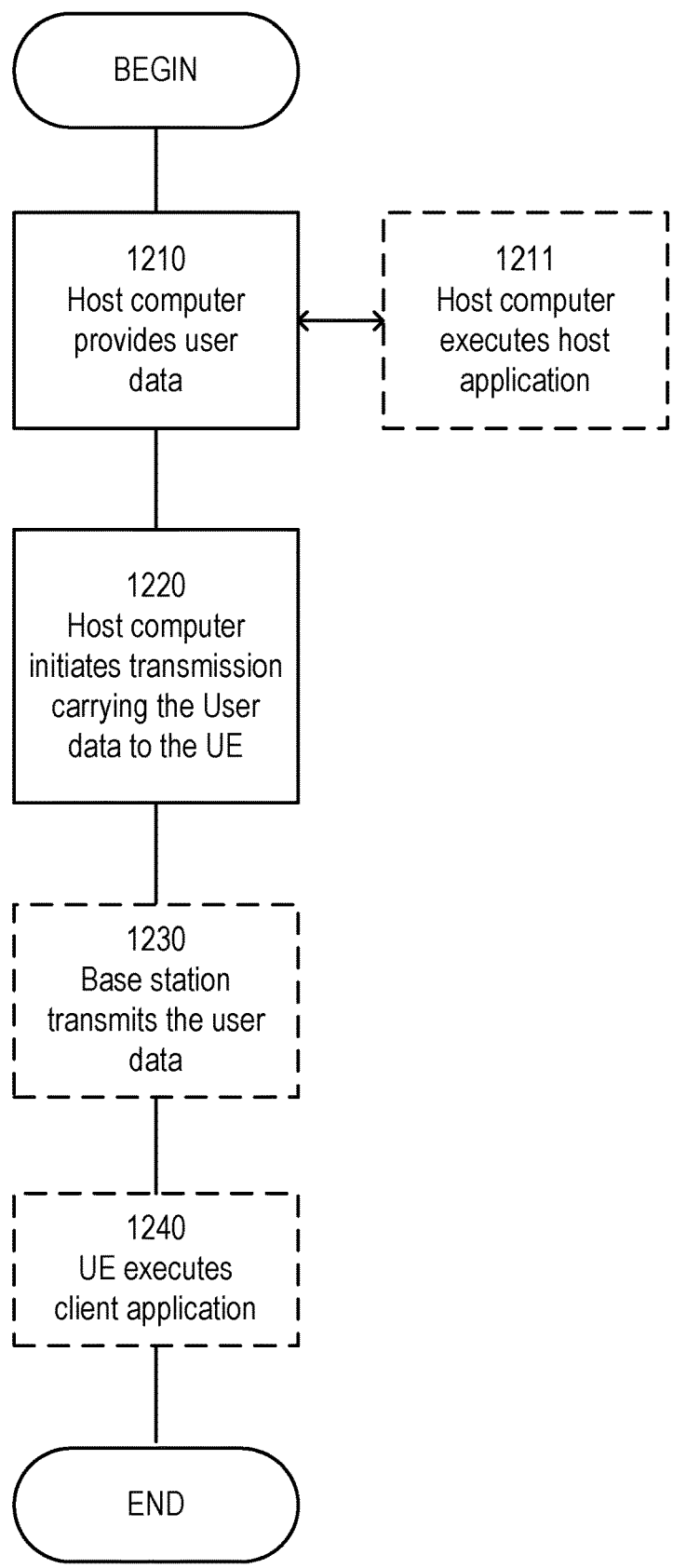
FIG. 12 illustrates methods implemented in a communication system including a host computer, a base station and a user equipment in accordance with some embodiments.

FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
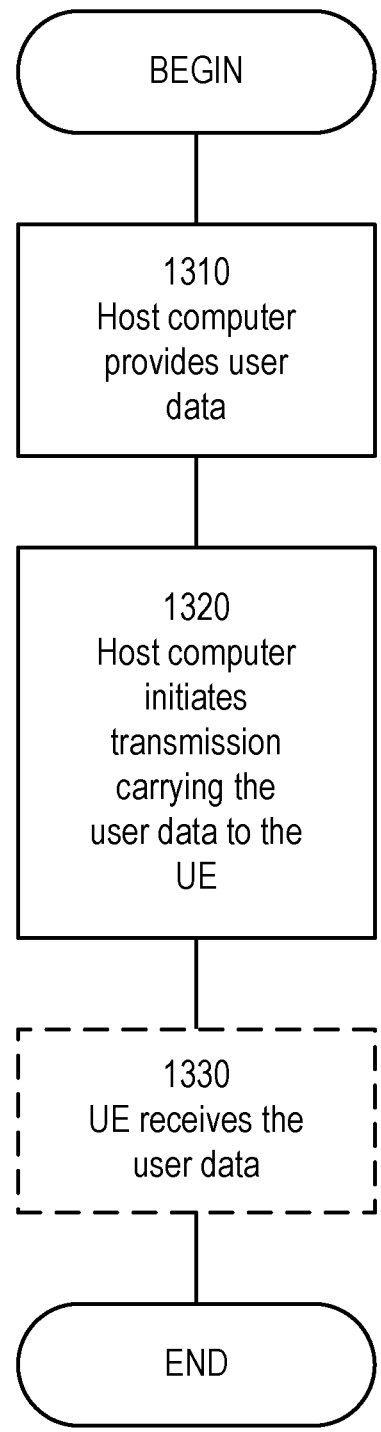
FIG. 13 illustrates methods implemented in a communication system including a host computer, a base station and a user equipment in accordance with some embodiments.

FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
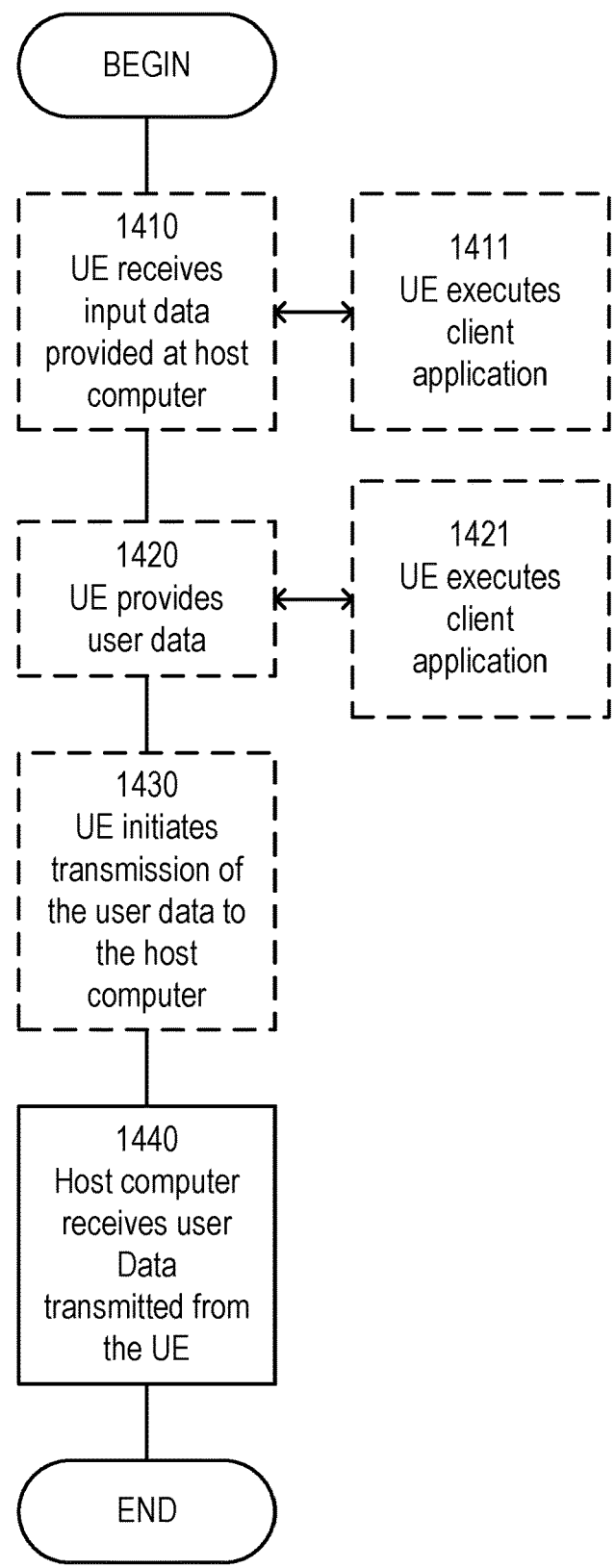
FIG. 14 illustrates methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
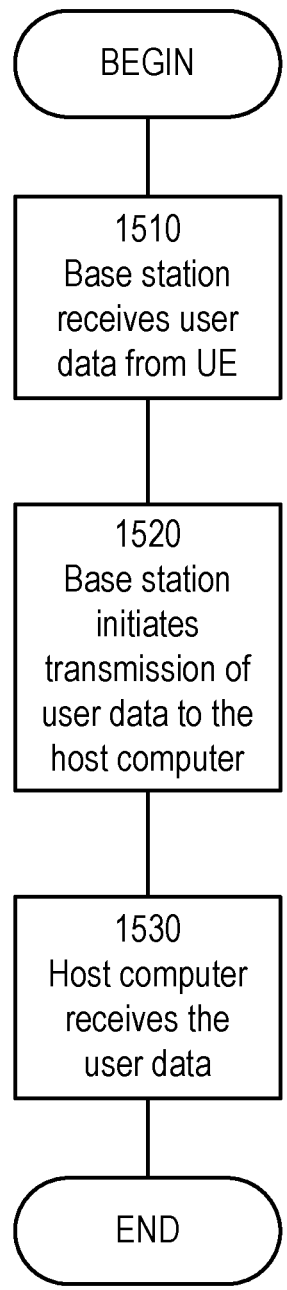
FIG. 15 illustrates methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method, in a first network node operable to initiate multicast broadcasts from a first base station in a wireless communications network, the method comprising:
  receiving a message from a second network node, wherein the second network node comprises a network node operable to initiate multicast broadcasts from a third base station in the wireless communications network;
  determining a target geographical area associated with the message;
  responsive to the target geographical area comprising a first geographical area associated with the first base station, determining that the message comprises information relevant to unmanned vehicles located in the first geographical area;
  responsive to determining that the message comprises information relevant to unmanned vehicles located in the first geographical area, initiating a broadcast of a report to a plurality of unmanned vehicles located within the first geographical area, wherein the report is based on the message; and
  responsive to the target geographical area comprising a second geographical area associated with a second base station in the wireless communications network, transmitting the message to a third network node to initiate multicast broadcasts from the second base station.

2. The method as claimed in claim 1 further comprising receiving the message from the second network node via an internet connection between the first network node and the second network node.

3. The method as claimed in claim 1, wherein the second network node comprises a Flight Information Management System.

4. The method as claimed in claim 1 further comprising: determining a category of the report; and
initiating the broadcast of the report from the first base station over a communication channel associated with the category.

5. The method as claimed in claim 1 further comprising; receiving a plurality of messages from a plurality of network nodes.

6. The method as claimed in claim 5 further comprising; filtering the plurality of messages to remove any repeated information in the messages; and
generating the report based on the filtered messages.

7. The method as claimed in claim 5 further comprising; generating the report by aggregating the received messages.

8. The method as claimed in claim 1, wherein generating the report is further based on information received from a database or information stored on the first network node.

9. A first network node operable to initiate multicast broadcasts from a first base station in a wireless communications network, the first network node comprising:
a processor; and
a memory containing instructions which, when executed by the processor, cause the first network node to:
receive a message from a second network node, wherein the second network node comprises a network node operable to initiate multicast broadcasts from a third base station in the wireless communications network;
determine a target geographical area associated with the message;
responsive to the target geographical area comprising a first geographical area associated with the first base station, determine that the message comprises information relevant to unmanned vehicles located in the first geographical area;
responsive to a determination that the message comprises information relevant to unmanned vehicles located in the first geographical area, initiate a broadcast of a report to a plurality of unmanned vehicles located within the first geographical area, wherein the report is based on the message; and
responsive to the target geographical area comprising a second geographical area associated with a second base station in the wireless communications network, transmit the message to a third network node to initiate multicast broadcasts from the second base station.

10. The first network node as claimed in claim 9, wherein the first network node to receive the message from the second network node via an internet connection between the first network node and the second network node.

11. The first network node as claimed in claim 9, wherein the second network node comprises a Flight Information Management System.

12. The first network node as claimed in claim 9, wherein the first network node to further:
process the message to determine a category of the report; and
transmit the report over a communication channel associated with the category.

13. The first network node as claimed in claim 9, wherein the first network node to further;
receive a plurality of messages from a plurality of network nodes.

14. The first network node as claimed in claim 13 further performing operations to;
filter the plurality of message to remove any repeated information in the messages; and
generate the report based on the filtered messages.

15. The first network node as claimed in claim 13 further performing operations to;
generate the report by aggregating the received messages.

16. The first network node as claimed in claim 9, wherein the report is generated further based on information received from a database or information stored on the first network node.

17. A non-transitory computer-readable storage medium comprising instructions which, when executed on at least one processor of a first network node operable to initiate multicast broadcast from a first base station in a wireless communication network, are capable of causing the first network node to perform operations comprising:
receiving a message from a second network node, wherein the second network node comprises a network node operable to initiate multicast broadcasts from a third base station in the wireless communications network;
determining a target geographical area associated with the message;
responsive to the target geographical area comprising a first geographical area associated with the first base station, determining that the message comprises information relevant to unmanned vehicles located in the first geographical area;
responsive to determining that the message comprises information relevant to unmanned vehicles located in the first geographical area, initiating a broadcast of a report to a plurality of unmanned vehicles located within the first geographical area, wherein the report is based on the message; and
responsive to the target geographical area comprising a second geographical area associated with a second base station in the wireless communications network, transmitting the message to a third network node to initiate multicast broadcasts from the second base station.

18. The non-transitory computer-readable storage medium as claimed in claim 17, wherein the second network node comprises a Flight Information Management System.

* * * * *